United States Patent [19]
Cline et al.

[11] Patent Number: 5,960,421
[45] Date of Patent: Sep. 28, 1999

[54] SERVICE INTERFACE REPOSITORY INTERNATIONALIZATION

[75] Inventors: Owen Richard Cline, Poway; B. Charles Eutsler, Escondido; My Tien Pare; Pamela Morgan Smurlo, both of San Diego, all of Calif.

[73] Assignee: BEA Systems, Inc., Sunnyvale, Calif.

[21] Appl. No.: 08/915,434

[22] Filed: Aug. 20, 1997

[51] Int. Cl.$^6$ ................................. G06F 17/30
[52] U.S. Cl. .................. 707/2; 707/4; 707/5; 707/1; 707/10; 707/100; 707/101; 707/102; 707/103; 707/104; 707/203
[58] Field of Search ................................. 707/1, 2, 4, 5, 707/10, 101, 102, 103, 104, 100, 203; 711/163; 340/506; 395/185.01, 703, 705, 750.01, 821; 706/45, 46; 345/439; 364/131

[56] References Cited

U.S. PATENT DOCUMENTS

| | | | |
|---|---|---|---|
| 5,600,778 | 2/1997 | Swanson | 395/333 |
| 5,764,977 | 6/1998 | Oulid-Aissa | 707/10 |
| 5,768,501 | 6/1998 | Lewis | 395/185.01 |
| 5,777,549 | 7/1998 | Arrowsmith et al. | 340/506 |
| 5,790,406 | 8/1998 | Dunn | 364/474.11 |

*Primary Examiner*—Thomas G. Black
*Assistant Examiner*—Diane D. Mizrahi
*Attorney, Agent, or Firm*—Fliesler, Dubb, Meyer & Lovejoy, LLP

[57] ABSTRACT

A method, apparatus, and article of manufacture for generation of tools and applications for a computer network. An access server, executed by a first computer, accesses interface definitions stored in a database, wherein the object names, short descriptions and long descriptions of the stored interface definitions are stored in at least one language ID and at least one code page. A data access library, coupled to the access server and executed by a second computer, provides the interface definitions to be stored in the database by the access server. A second server, coupled to the data access library and executed by a third computer, sends requests to the database through the access server, wherein the requests maintain and use the stored interface definitions. A string handler, coupled to the second server, stores and retrieves object names, short descriptions and long descriptions in a user specified language ID and code page. Furthermore, the string handler will retrieve interface definitions whose object names match a particular pattern including wildcards.

20 Claims, 2 Drawing Sheets

5,960,421

SERVICE INTERFACE REPOSITORY INTERNATIONALIZATION

CROSS-REFERENCE TO RELATED APPLICATIONS

This application is related to the following applications:

Application Ser. No. 08/915,214, now patent 5,884,317 entitled "SERVICE INTERFACE REPOSITORY," filed on same date herewith, by Owen R. Cline et al.;

Pending application Ser. No. 08/914,991, entitled "SERVICE INTERFACE REPOSITORY CODE GENERATION DATA," filed on same date herewith, by Owen R. Cline et al.;

Pending application Ser. No. 08/914,988, entitled "SERVICE INTERFACE REPOSITORY APPLICATION PROGRAMMING MODELS," filed on same date herewith, by Owen R. Cline et al.;

Pending application Ser. No. 08/904,406, entitled "SOFTWARE INTERFACE ADAPTER FOR USE WITH MULTIPLE DEVELOPMENT TOOLS," filed on Jul. 31, 1997, by Jack P. Dundon et al.;

Pending application Ser. No. 08/904,401, entitled "SOFTWARE INTERFACE FOR DYNAMIC MAPPING, " filed on Jul. 31, 1997, by Jack P. Dundon et al.; all of which are incorporated by reference herein.

BACKGROUND OF THE INVENTION

1. Field of the Invention

This invention relates in general to computer networks, and in particular to a tool for application development for object based computer networks.

2. Description of Related Art

An important trend in the industry is the development of client/server architectures in distributed computing environments to support transaction processing applications. Currently, distributed computing environments typically comprise interconnected mainframes, minicomputers, servers and workstations. This integration of mainframes, minicomputers, servers and workstations into a distributive computing environment creates the need for tools capable of operating in this environment, especially tools that assist in development of applications for distributed computing environments.

SUMMARY OF THE INVENTION

The present invention discloses a method, apparatus, and article of manufacture for a tool that assists in the development of applications for object based computer networks. An access server, executed by a first computer, accesses interface definitions stored in a database, wherein the stored interface definition's object names, short descriptions and long descriptions are stored in at least one language and at least one code page. A data access library, coupled to the access server and executed by a second computer, provides the interface definitions to be stored in the database by the access server. A second server, coupled to the data access library and executed by a third computer, sends requests to the database through the access server, wherein the requests maintain and use the stored interface definitions. A string handler, coupled to the second server, retrieves and/or updates an interface definition's object name, short description or long description based on the user specified language ID and code page. Furthermore, the string handler will retrieve interface definitions whose object names match a particular pattern including wildcards.

An object of the present invention is to provide tools to aid in interfacing with computer networks. Another object of the present invention is to provide an improved method of storing information about the networks and the components executed by the nodes. Still another object of the present invention is to provide a universal method for customers and third party vendors to create their own tools and utilities which can store information in any language ID and code page of their choosing.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
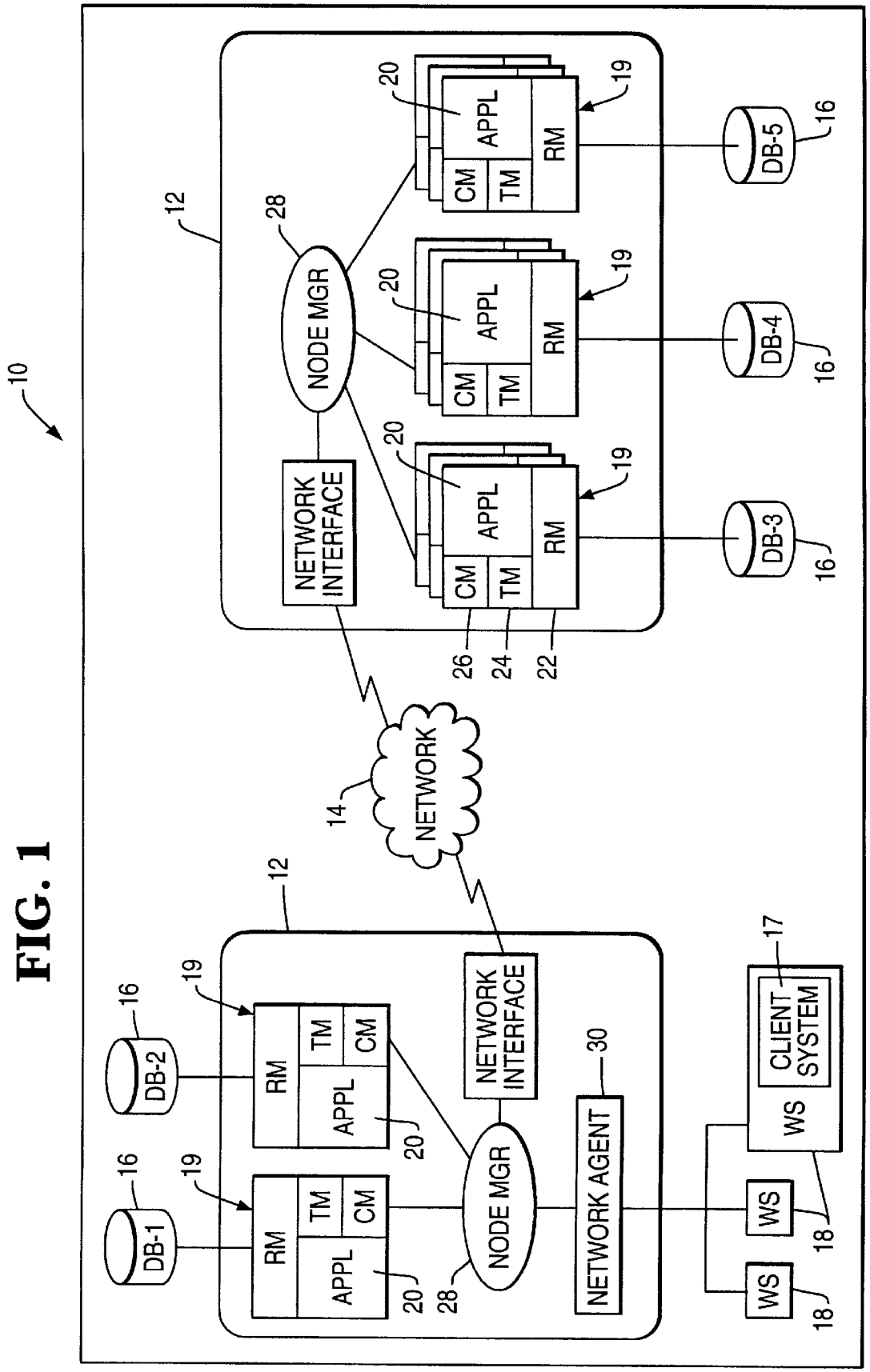
FIG. 1 is an exemplary illustration of a distributed computing environment known as a TOP END™ system.

FIG. 1 is an exemplary illustration of a distributed computing environment 10, known as a TOP END™ system. The present invention comprises a method, apparatus, and program product for facilitating the applications development in such distributed computing environments.

A TOP END™ system 10 is comprised of one or more nodes 12 interconnected by a network 14, wherein each of the nodes 12 is comprised of one or more computers. Each of the nodes 12 is typically coupled to one or more fixed and/or removable data storage units (DSUs) 16, such as disk drives, that store one or more databases.

In the exemplary environment of FIG. 1, a client-server architecture is disclosed. At least one of the nodes 12 provides the connection to client systems 17 operating on workstations 18. The client systems 17 can also be an application component 19 running inside the node 12. Operators of the TOP END™ system 10 use a workstation 18 or terminal to transmit electrical signals to and from server systems operating on the node 12 in the TOP END™ system 10, wherein the electrical signals represent commands for performing various services in the TOP END™ system 10, such as search and retrieval services against the databases. Those skilled in the art will recognize, however, that the present invention has application to any service or software that can be performed by a TOP END™ system 10.

According to the present invention, these services are divided into several modular components 19 that are designed for a distributed, message-passing computing environment. In TOP END™ terminology, a "component" 19 is a process or logical group of processes that performs one or more services. The components 19 work together to process distributed transactions initiated by the client systems 17.

Work is divided among the nodes 12 in the TOP END™ system 10 by spreading the location of these modular components across the nodes 12. Thus, each node 12 performs some localized service and work is managed by the TOP END™ system 10 so that a sequence of multiple services comprising a client system 17 request is performed by one or more of the modular components on one or more of the nodes 12 in the TOP END™ system 10.

The fundamental component in a TOP END™ system 10 is the application component 19. The application component 19 contains application code 20 that links with the libraries to create an application component 19. Application components 19 are used to create and grow distributed TOP END™ systems 10. The application components 19 could be user-written, provided as a solution by an independent vendor, or supplied as part of the TOP END™ system 10. In a TOP END™ system 10, libraries are available to an application component 19, including resource managers 22 such as database management systems (DBMS), transaction managers 24, and communications managers 26.

Another component of a TOP END™ system 10 is the node manager 28. The node manager 28 is a collection of processes that offer core services to coordinate processing among nodes 12. These processes, in general, work independently of each other. Services provided by the node manager 28 include transaction management (for example, commit coordination), logging, failure recovery, client/server request handling, security management, runtime administration, and application component 19 control.

Still another component of a TOP END™ system 10 is the network agent 30. Network agents 30 are used to allow transactions and service requests to enter a TOP END™ system 10 from an application component 19 or networked workstation 18 that does not have a node manager 28 on it.

Table 1 provides a listing for database objects and descriptions of items related to the Top End systems and components.

Service Interface Repository Description

Figure 2:
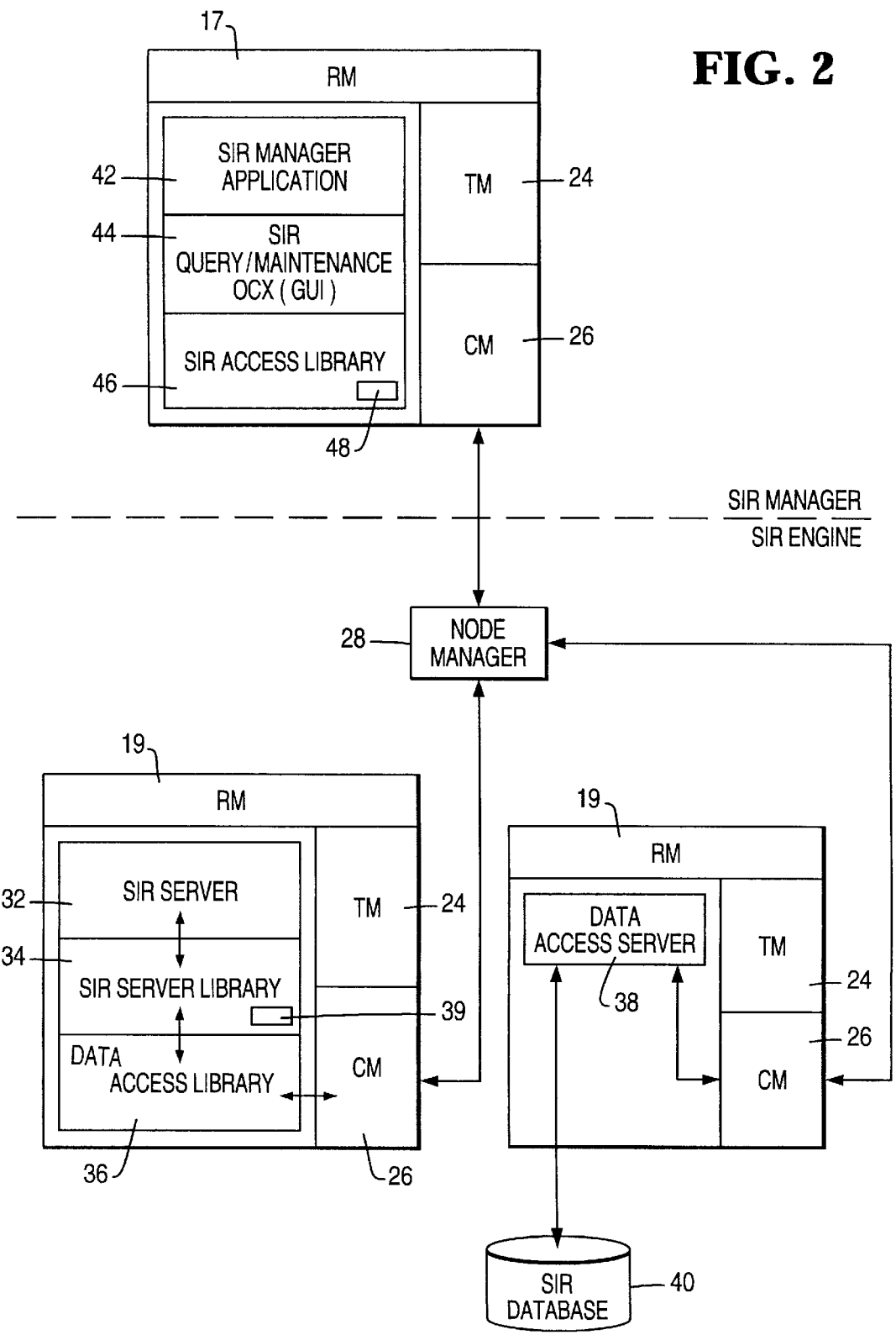
FIG. 2 illustrates the components of the present invention and their relationship to each other.

FIG. 2 illustrates the components of the present invention and their relationship to each other.

The Service Interface Repository (SIR) accelerates development of products, (i.e., combined client systems, application components, and resource managers) that work within the TOP END™ environment. The SIR allows users to store and retrieve the service interface definitions of these products. The definitions can then be used by tools that are integrated with the TOP END™ system 10, via the SIR, for generating code for these products. In addition to supporting code generators, a central repository also means that TOP END™ products and services can be more readily and easily used and reused in new product development. In terms of cost savings, a SIR means that code can be written faster, with fewer rewrites, and can be deployed into the field faster.

The SIR contains features that exceed the most basic information that is needed to generate code for TOP END™ products and services. These additional features include support for aggregate data types (structures, unions and tagged unions), user defined data types, code generation data (default values, validation specifications and Graphical User Interface (GUI) presentation hints), and support for runtime identification of repeating records, tagged unions and output buffers.

Every TOP END™ product is developed to provide one or more services. Each one of these services operates on client system 17 input data and responds to the client system 17 with output data. When requesting a service, a client system 17 needs to know the layout of the input data to send to the application component 19 and the layout of the output data it receives from the application component 19. The current method of developing client systems 17 is manual, such that the interfaces to services, such as the data layouts, are documented by the developer, and read by the client system 17 developer to manually generate client system 17 code. This manual generation of client system 17 code could be automated if the interfaces to services were defined and programmatically accessible.

Further, the simplification and generation features of the present invention can be applied to servers. For example, server definitions are placed into the SIR Database and documentation, template server code, etc. would be generated.

The present invention allows for the SIR Database to store object names, short descriptions and long descriptions in multiple language IDs and code pages. If a user wants an interface definition in one language and the information is not stored in that language, the present invention first attempts to find a best match (on the language ID), and then English. In the case of no match, information is provided to allow the client to compose a default name if so desired.

A service interface definition is usually composed of a TOP END™ system 10 with at least one product, one or more services within each product, and the input data and output data for each service.

Input and output data is described using buffers.

Multiple buffers indicating multiple protocols within each service are supported.

Buffers are made up of fields and each field has a type. Types can be one of the SIR base types, a user-defined typedef or an aggregate. In addition, code generation data can be specified for each field. Each field is also named such that code generators can use the names for variables and labels.

Further, buffers and aggregates (structures, unions, and tagged unions) can have fields with dynamic and static repetitions. The repetition field represents how many occurrences of the field are within the buffer or aggregate. For static repetitions, any positive non-zero constant integer value can be specified. Dynamic repetitions can either be end-of-buffer or a repeating record count. A repeating record count is a pointer to a preceding field that contains the count of the number of times that the field repeats. Repeating record count fields must precede the field and be of integer or ASCII numeric (precision 0) type. For aggregates, the end-of-buffer capabilities are not available.

As mentioned above, users are able to define their own data types. Users are able to define structures which allow a collection of fields (such as name and address) to be reused in the definitions of multiple services. Typedefs can be defined by tool integrators whose tools support data that can't be represented in-terms of the SIR's predefined types. An example of this is the typical "datetime" data type which is supported by all commercial databases but whose internal representation is non-standard. By allowing user-defined typedefs, an "Oracle DateTime" data type can be defined. This data type is different than the "SQL Server DateTime" data type, which also may be defined.

Table 2 illustrates an example set of types utilized by the Service Interface Repository (SIR).

Unions and tagged unions can also be defined. Tagged unions provide assistance to code generation programs because there is a defined variable for runtime identification of the union contents. The type of the tag is specified by the user and can be a 1, 2 or 4 byte binary field, or an ASCII numeric field of a length specified by the user.

Buffers, fields, aggregates and types are reusable objects which can be used in the definition of multiple objects.

The present invention also supports unrestricted categories (or groupings) of objects. Multiple levels of categories can be used to organize system/product/service groupings into a hierarchy. Multiple category paths to the same system/product/service grouping are allowed.

The present invention supports product development in a TOP END™ system 10 as well as third parties who wish to integrate their development tools with the TOP END™ system 10.

For example, a code generator is a type of tool integration. A code generator uses the present invention to display the available products and services and retrieve the definition of the TOP END™ products and services the user selects. The code generator uses the interface definition to generate a client system 17 application for that tool's development environment.

It is envisioned that the present invention can be used by tool vendors who are performing an integration with TOP END™ via the SIR, and by developers who are using the integrated tool (developed by the tool vendor) to create an actual client system 17. The developer can then deploy their client system 17. Further, a customer can integrate the SIR into a custom development environment, or create utilities that generate files that are read in and customized by existing development environments. The simplification and generation features of the present invention can also be applied to servers within the distributed processing system. For example, server definitions are placed into the SIR Database 40 and documentation, template server code, etc. would be generated.

Detailed Description of the Service Interface Repository

The SIR is a collection of programs and libraries for maintaining and accessing a repository of service interface definitions. These programs and libraries can be broken into two groups: the SIR Manager and the SIR Engine.

As shown in FIG. 2, the SIR Engine is comprised of the SIR Server 32, the SIR Server Library 34, the Data Access Library 36, the Data Access Server 38, and the SIR Database 40. The SIR Manager is comprised of the SIR Manager Application 42, the SIR Query/Maintenance Object Linking and Embedding (OLE) Control Library (OCX) 44, and the SIR Access Library 46. The SIR Manager components are typically resident on a client system 17. The SIR Manager and the SIR Engine are described in more detail in pending application Ser. No. 08/914,988 U.S. patent application entitled "SERVICE INTERFACE REPOSITORY," filed on same date herewith, by Owen R. Cline et al., which is incorporated by reference herein.

Detailed Description of SIR Internationalization

The database schema for the SIR Database 40 is organized in such a way that object names (those that are not restricted to ASCII), short descriptions and long descriptions can be stored in multiple languages and code pages. This is accomplished by having a separate table for localized strings.

When an object and/or description is created, a string handler 39 and/or 48 makes an entry in the strings table which stores the string along with its language ID and code page. At creation time, the string handler 39 and/or 48 assigns a unique string ID to the string which is then stored in the specific object table. If a modification is made to an object's name and/or description, the string handler 39 and/or 48 first checks determine if that translation exists. If so, it will be modified. If not, a new entry in the strings table, using the same string ID, will be created by the string handler 39 and/or 48 to store the new translation. In this case, a new translation of the same string will be created.

A client of the SIR can specify a desired language ID and code page (where the default language ID is American English and the default code page is 1252). When returning object names and/or descriptions, the string handler 39 and/or 48 attempts to locate exact string translations which match the specified language ID and code page of the client. If an exact string translation is not found, the string handler 39 and/or 48 attempts to locate a non-exact string translation. A non-exact translation is defined as one where the primary languages match (i.e. the client wants an French translation but only a Swiss French translation is available) and where the code pages do not have to match. If a non-exact match cannot be found, the string handler 39 and/or 48 attempts to locate and return an default, typically English, translation. If an English translation is not found, the string handler 39 and/or 48 returns a null string for all object names, short descriptions and long descriptions. In all cases, the requested object (which itself is language independent) and the string ID for each localizable object name is returned along with the object. The string ID is returned in case an exact translation is not available. The client can then determine what to do. The client may chose to display the non-exact translation as returned, access the SIR Database 40 again and enumerate through all of the available translations displaying the best choice for the moment or display an alternate translation. An example of when an alternate translation is appropriate is when a null string translation is returned. A client could then create a translation composed of a unique string prefix and the string ID. This is the method the SIR OCX 44 (and thus the SIR Manager application 42) uses when a null object name is returned. For example, if a null buffer name with string ID #12 is returned the SIR OCX 44 will display and/or return the object name as "buffer$_{13}$ 12". In the case of short and long descriptions, the SIR OCX 44 will leave them as null strings (in a no match situation).

Regarding localized strings, the string handler 39 and/or 48 allows a client to locate one or more objects (using object names) or descriptions using pattern matching with wildcard characters (both the SIR Access Library 46 and the SIR Server Library 34 implement pattern matching, the former for cached strings and the latter for strings in the SIR Database 40). Two characters, the asterisk ('*') and the question mark ('?'), are reserved as wildcard characters. An asterisk will match zero or more characters in a string. A question mark will match one character in a string. These two characters were selected since they are the same in all code pages.

Pattern matching is supported for Single Byte Character Sets, Double Byte Character Sets and the Unicode Character Set.

Conclusion

In summary, the present invention discloses a method, apparatus, and article of manufacture for a tool that assists in the development of applications for object-based computer networks. An access server, executed by a first computer, accesses interface definitions stored in a database, wherein the stored interface definitions are stored in at least one language and at least one code page. A data access library, coupled to the access server and executed by a second computer, provides the interface definitions to be stored in the database by the access server. A second server, coupled to the data access library and executed by a third computer, sends requests to the database through the access server, wherein the requests maintain and use the stored interface definitions. A string handler, coupled to the second server, handles requests for localized strings.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| | |
|---|---|
| Hierarchical Categories | Any number of category levels can be used to organize system/product/service groupings into a hierarchy. Multiple category paths to the same system/product/service grouping will be allowed. |
| TOP END ™ Systems | One or more TOP END ™ systems can be created from the root node. System names must be unique and adhere to TOP END ™ naming conventions. |
| TOP END ™ Products | One or more TOP END ™ products can be created in a system. Product names must be unique within a system and adhere to TOP END ™ naming conventions. |
| TOP END ™ Service Definitions (TOP END ™ Services) | A server developer can define buffers for a system/product/service grouping. Service names must be unique within a product and adhere to TOP END ™ naming conventions. The TOP END ™ Service is defined to conform to a specified Application Programming Model (APM). The models are:<br>● One Input/One Output Buffer<br>This model will be used by TOP END ™ Services that have one input buffer and one output buffer. If the user does not define an input buffer, the service takes no input. If the user does not define an output buffer, the service produces no output.<br>● Multiple Input/Multiple Output Buffers (uses tag)<br>This model is used when the service can accept different input and/or return different output buffers. The client prefixes its buffer with the number which identifies which buffer is being sent. The service prefixes its buffer with the number which identifies which buffer is being returned. (This is not defined as an actual field in the buffer)<br>● Multiple Input/Multiple Output Buffers (uses Format name)<br>This model is used when the service can accept different input and/or return different output buffers. The client sets the input_format structure with the format name to identify which buffer is being sent. The service sets the output_format structure with the format name to identify which buffer is being returned.<br>● Single Input/Output Buffer<br>This model specifies one buffer for both input and output for the service. The buffer contains fields that are input to the service output from the |

TABLE 1-continued

| | |
|---|---|
| | service and fields that are both input and output. One field can be identified as being the return value for the service.<br>● Free Form<br>This model allows users to define as many input buffers and output buffers as they want. There is no mechanism for identifying which buffer is being used. This model provides limited support to users of the SIR who are doing code generation since there is no identification of buffers at runtime.<br>The purpose of APMs is to provide an indicator to code generators to uniquely identify the buffers used to communicate with TOP END ™ services. This benefit applies to all APMs with the exception of Free Form. |
| Buffer Descriptions | A server developer can group any number of fields into a buffer description. Buffer descriptions support the ability to handle repeating fields. Repeating fields can be specified at development time or detected at runtime. The number and types of buffers defined for a service are specified by its APM. |
| Field Descriptions | Buffers and aggregates are made up of fields. The type of these fields may be one of the provided basic types or a user defined abstract data type. |
| Abstract Data Types | A server developer can define three types of abstract data types (ADT) to be used to type fields. They are: typedefs, structures and unions (including tagged unions). For both structures and unions, nesting is allowed. Regarding unions, tagged unions give information to code generators that let them identify which information is in the union at runtime. Untagged unions do not contain information that would allow code generators to generate code that automatically determines the contents of the union. |
| Default Value Specifications | A server developer can specify a default value for a field description. Separate tables are used for text and scalar field descriptions. A default value would be used to assign an initial value and/or mandate that a value be entered for a particular field. |
| Presentation Hints | A server developer can specify a presentation hint for a field description. These will be used by a code generation program when building the forms to use in a GUI application. They could specify that a Boolean value should be shown as a radio button instead of a checkbox. Other available controls are: single-line edit boxes, single-line text boxes, multi-line edit boxes, multi-line text boxes, list boxes, editable drop-down lists and noneditable drop-down lists. In addition, there is a value that says the field should not be displayed (but its value stored where it can be used or set) and a value that says the field should be ignored. |
| Validation Specifications | A server developer can specify a validation specification for a field description. A validation specification would be used to restrict the values allowed in a particular field description. For example, an integer field could only range from 50 to 100. Separate tables are used for text and |

TABLE 1-continued scalar fields. The validation
specification for text fields contain
strings that describe valid values for
the field. The validation specification
for scalar fields contain a list of
ranges of numbers that are valid for the
field.

TABLE 2

| Type | Description |
|---|---|
| SIR_CHAR_T | Single-byte character data |
| SIR_WCHAR_T | Multi-byte character data (2 bytes) |
| SIR_INT8_T | One-byte signed integer |
| SIR_UNIT8_T | One-byte unsigned integer |
| SIR_INT16_T | Two-byte signed integer |
| SIR_UINT16_T | Two-byte unsigned integer |
| SIR_INT32_T | Four-byte signed integer |
| SIR_UINT32_T | Four-byte unsigned integer |
| SIR_INT64_T | Eight-byte signed integer |
| SIR_UINT64_T | Eight-byte unsigned integer |
| SIR_FLOAT_T | Four bytes, internal format is application specific |
| SIR_DOUBLE_T | Eight bytes, internal format is application specific |
| SIR_ASCII_NUMERIC_T | Numeric information that has been converted to an ASCII string |
| SIR_BYTE_T | Byte array (1 to n bytes) |

What is claimed is:

1. A programming tool for a distributed processing system, comprising:
   an access server, executed by a first computer, configured to access interface definitions stored in a database, wherein the interface definitions are stored in at least one language and at least one code page;
   a data access library, coupled to the access server and executed by a second computer, configured to provide the interface definitions to be accessed in the database by the access server;
   a second server, coupled to the data access library and executed by a third computer, configured to send requests to the database through the access server, wherein the requests maintain and use the interface definitions; and
   a string handler, coupled to the second server, configured to store and retrieve a string to complete the request of the second server.

2. The programming tool of claim 1, wherein the programming tool further comprises:
   an access library, executed by a fourth computer, configured to access the server and pass query and maintenance requests to the server; and
   a control, executed by a fifth computer, configured to interface with the access library.

3. The programming tool of claim 2, further comprising a graphical interface program, executed by a sixth computer, configured to graphically display the query and maintenance requests and query and maintenance results on a display of the computer.

4. The programming tool of claim 3, wherein the fourth computer, the fifth computer, and the sixth computer are the same computer.

5. The programming tool of claim 3, wherein the first computer, the second computer, the third computer, the fourth computer, the fifth computer, and the sixth computer are the same computer.

6. The programming tool of claim 2, wherein the string is selected from a group comprising an exact match for a requested language, a primary language match for the requested language, a default language, and a string identifier.

7. The programming tool of claim 2, wherein the control creates a default interface definition.

8. The programming tool of claim 2, further comprising a second string handler, coupled to the access library, configured to store and retrieve a string to complete the request of the second server.

9. The programming tool of claim 2, wherein the second string handler further comprises a pattern matcher configured to match a requested pattern to the string.

10. The programming tool of claim 2, wherein the fourth computer and the fifth computer are the same computer.

11. The programing tool of claim 1, wherein the second string handler further comprises a pattern matcher configured to match a requested pattern to the string.

12. The programming tool of claim 1, wherein the string is selected from a group comprising an exact match for a requested language, a primary language match for the requested language, a default language, and a string identifier.

13. The programming tool of claim 1, wherein the first computer, the second computer, and the third computer are the same computer.

14. The programming tool according to claim 1, wherein:
   said string handler comprises,
   a string table that maintains a list of strings and identifying information corresponding to the interface definitions;
   a pattern matcher that matches a string of the request of the second server to a string in the list of strings;
   a retrieval device that retrieves an interface definition from said data access library according to the identifying information of the matched string when the request of the second server is to retrieve; and
   a storage device that stores the string of the request of the second server and identifying information in said string table when the request of the second server is to store.

15. The programming tool according to claim 14, wherein:
   said matched string comprises one of,
   an exact match between a string in said string table and the retrieved string,
   a primary language match where a primary language of a string in said string table matches a primary language of the retrieved string,
   a default match, comprising a default language string; and
   a null string when neither an exact match, primary language match, nor default match is found.

16. A method for storing and accessing definitions of interfaces for an object-oriented computer network, comprising the steps of:
   accessing interface definitions stored in a database, based on a user specified language ID and code page;
   developing the interface definitions to be stored in the database, based on the user specified language ID and the code page; and
   sending request in the user specified language ID and the code page to the database wherein the requests maintain and use the stored interface definitions.

17. The method of claim 16, further comprising the step of graphically accepting the maintenance requests and displaying the query results on a display of the computer in the user's specified language ID and code page.

18. The method according to claim 16, further comprising the steps of:

receiving a string identifying an interface definition and a request for retrieving an interface definition;

matching the received string against a list of strings, each string of said list of strings having a language id and code page; and retrieving an interface definition from a data access library utilizing the corresponding language id and code page of the matched string.

19. The method according to claim 18, wherein:

said step of matching comprises one of, finding an exact match to the received string, finding a primary language match to the received string, finding a default language match to the received string; and returning a null match if neither an exact, primary, nor default match is found.

20. A program storage device, readable by a computer, tangibly embodying at least one instruction executable by the computer to perform a method for storing definitions of interfaces for an object-orientated computer network, the method comprising the steps of:

accessing interface definitions stored in a datebase, based on a user specified language ID and a code page;

developing the interface definitions to be stored in the database on the user specified language ID and the code page; and sending request in the user specified language ID and the code page to the database wherein the request maintain and use the stored interface definitions.

* * * * *